United States Patent
Okuyama

(10) Patent No.: US 6,961,150 B2
(45) Date of Patent: Nov. 1, 2005

(54) IMAGE PROCESSING APPARATUS AND IMAGE FORMING APPARATUS

(75) Inventor: Hiroyuki Okuyama, Kawasaki (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 894 days.

(21) Appl. No.: 09/955,188

(22) Filed: Sep. 19, 2001

(65) Prior Publication Data

US 2003/0053137 A1 Mar. 20, 2003

(51) Int. Cl.$^7$ .............................................. G06K 15/00
(52) U.S. Cl. ..................... 358/3.12; 358/2.1; 359/480; 359/471
(58) Field of Search ............................. 358/3.12, 2.1, 358/501, 502, 503, 510, 443, 462, 471, 480; 359/336, 301

(56) References Cited

U.S. PATENT DOCUMENTS

| | | | | |
|---|---|---|---|---|
| 4,661,861 A | * | 4/1987 | Rutherford et al. | ......... 358/302 |
| 5,357,583 A | * | 10/1994 | Sato et al. | ................... 382/269 |
| 6,108,105 A | * | 8/2000 | Takeuchi et al. | ............. 358/1.2 |
| 6,278,804 B1 | | 8/2001 | Okuyama | .................... 382/261 |
| 6,795,576 B2 | * | 9/2004 | Uchida et al. | .............. 382/164 |
| 2001/0028334 A1 | * | 10/2001 | Ishizuka | ....................... 345/76 |
| 2003/0053137 A1 | * | 3/2003 | Okuyama | .................. 358/3.12 |

FOREIGN PATENT DOCUMENTS

JP      9-85993      3/1997      .............. B41J/2/52

* cited by examiner

*Primary Examiner*—Jerome Grant, II
(74) *Attorney, Agent, or Firm*—Foley & Lardner LLP

(57) ABSTRACT

An image processing apparatus includes an edge detecting unit which identifies an area of given image data as a gradation sequence area and a character/line art area and which outputs edge information of the character/line art, a level converting unit which generates a strength modulation signal so as to emphasize an edge of the character/line art area, a laser driver which outputs a laser drive signal in order to form a picture dot larger than a standard size in response to the strength modulation signal. Further, according to the present invention, it is possible to print an image with emphasizing an edge portion of a character/line art by a laser printer.

17 Claims, 7 Drawing Sheets

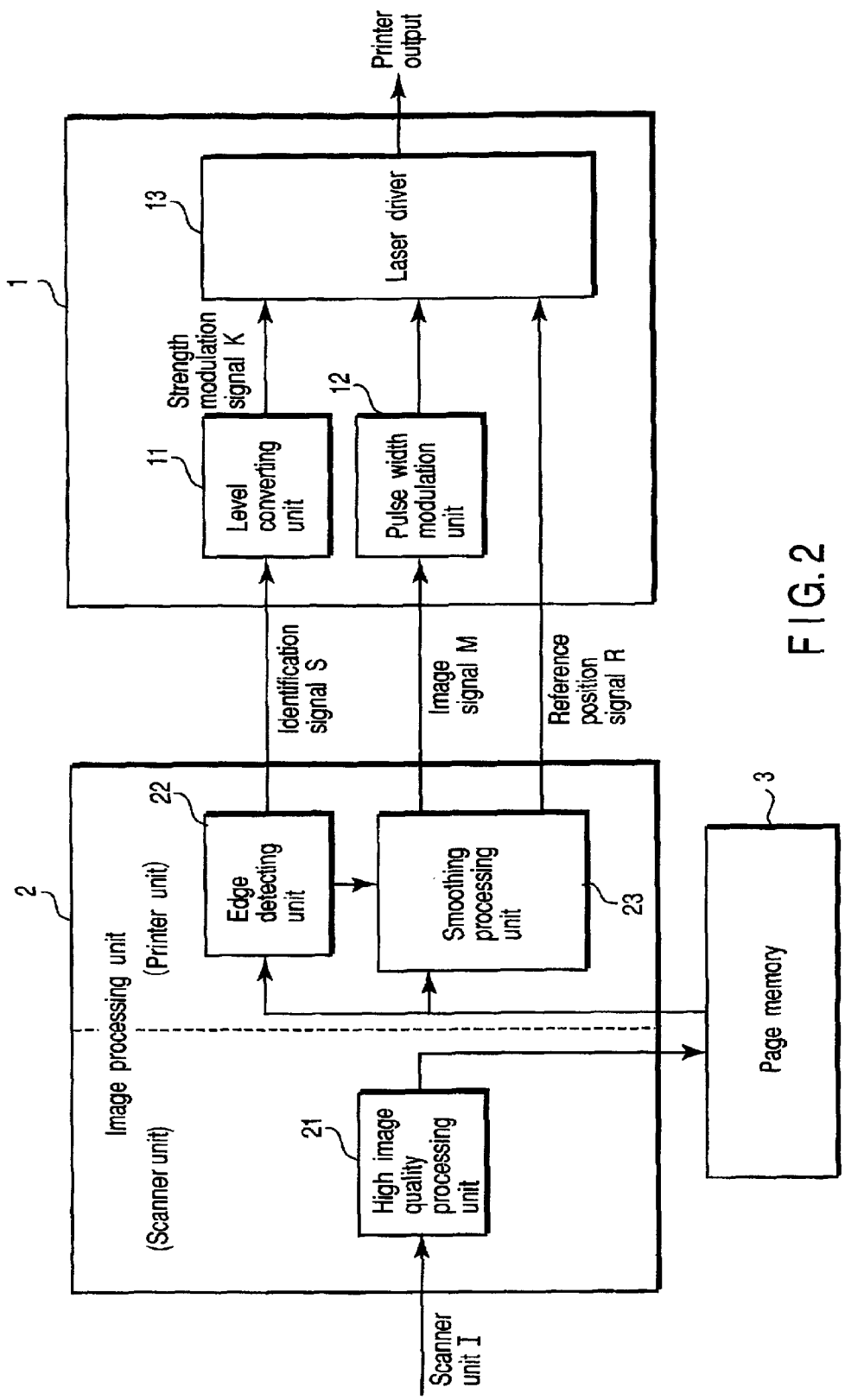
F I G. 2

IMAGE PROCESSING APPARATUS AND IMAGE FORMING APPARATUS

BACKGROUND OF THE INVENTION

Conventionally, in the case of identifying a character and a line art and printing an image of a script, in which a halftone area as a photograph area and a character/line art area are mixed, by a laser printer copying machine, if a user intends to maintain a gradation sequence of the halftone area as reducing identification error, there is a problem such that sharpness of the character/line art area is lost.

Alternatively, since the correction of image density is within a dynamic range by PWM modulation, there is a limit in the emphasis of the image. Therefore, this involves a problem such that the image of the character/line art having sufficient emphasis cannot be obtained.

BRIEF SUMMARY OF THE INVENTION

An object of the present invention is to provide an image processing apparatus and an image forming apparatus capable of realizing laser printing having a high contrast in a character and a line art by detecting an edge of the character and the line art with the image processing unit and controlling a power of a laser beam in response to this detection.

The present invention provides an image processing apparatus comprising an edge detecting unit which identifies an area of given image data as a gradation sequence area and a character/line art area and which outputs edge information of the character/line art on the basis of this identification result; a level converting unit which generates a strength modulation signal in order to convert a level of the image data into a value different for each area on the basis of the edge information from the edge detecting unit; and a laser driver which outputs a laser drive signal in order to form a picture dot larger than a standard size in a predetermined area detected by the edge detecting unit in response to the strength modulation signal to be supplied from the level converting unit with respect to the given image data.

According to the present invention, a strength modulation signal for amplifying an output of a laser printer is generated corresponding to edge information of a character/line art. Then, on the basis of this signal, a laser drive signal is generated to drive a printer unit of the laser printer. Accordingly, it is possible to realize the laser print capable of obtaining a print dot larger than a standard size in association with the edge information of the character/line art area, thereby obtaining a distinctive emphasis image of the character/line art which cannot be obtained by a conventional apparatus.

BRIEF DESCRIPTION OF THE SEVERAL VIEWS OF THE DRAWING

FIG. 2 is a block diagram of the image processing apparatus having smoothing processing to use pulse width modulation and strength modulation together according to the present invention;

DETAILED DESCRIPTION OF THE INVENTION

Figure 1:
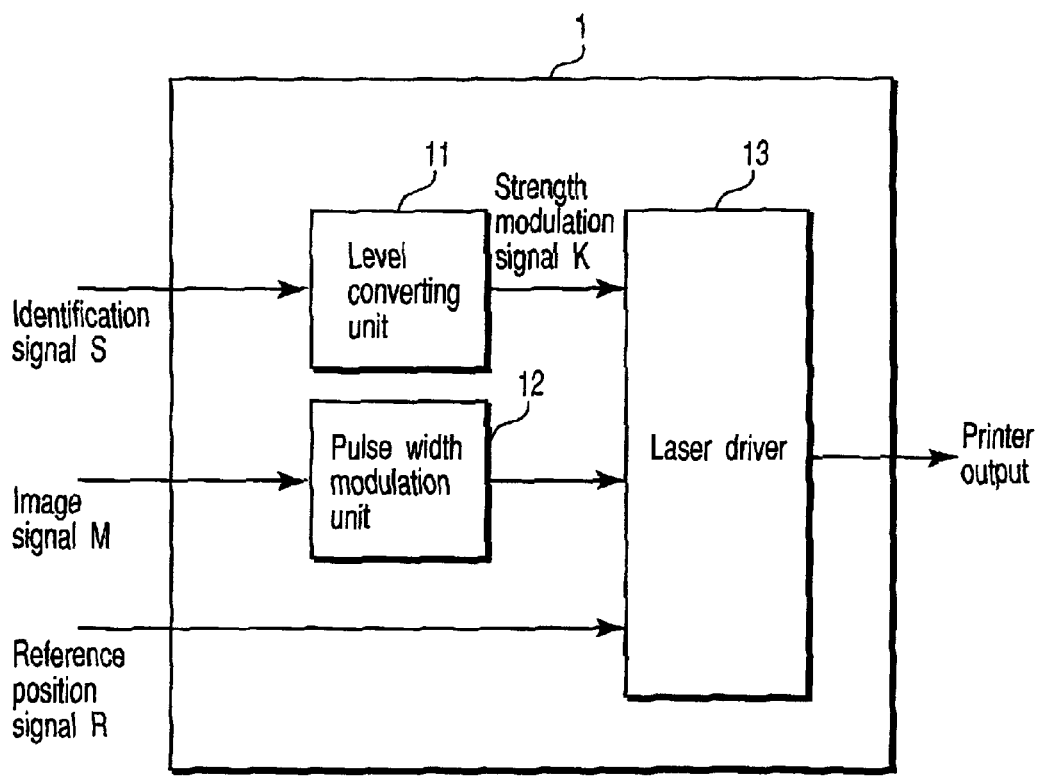
FIG. 1 is a block diagram of an image processing apparatus to use pulse width modulation and strength modulation together according to the present invention.
Figure 3:
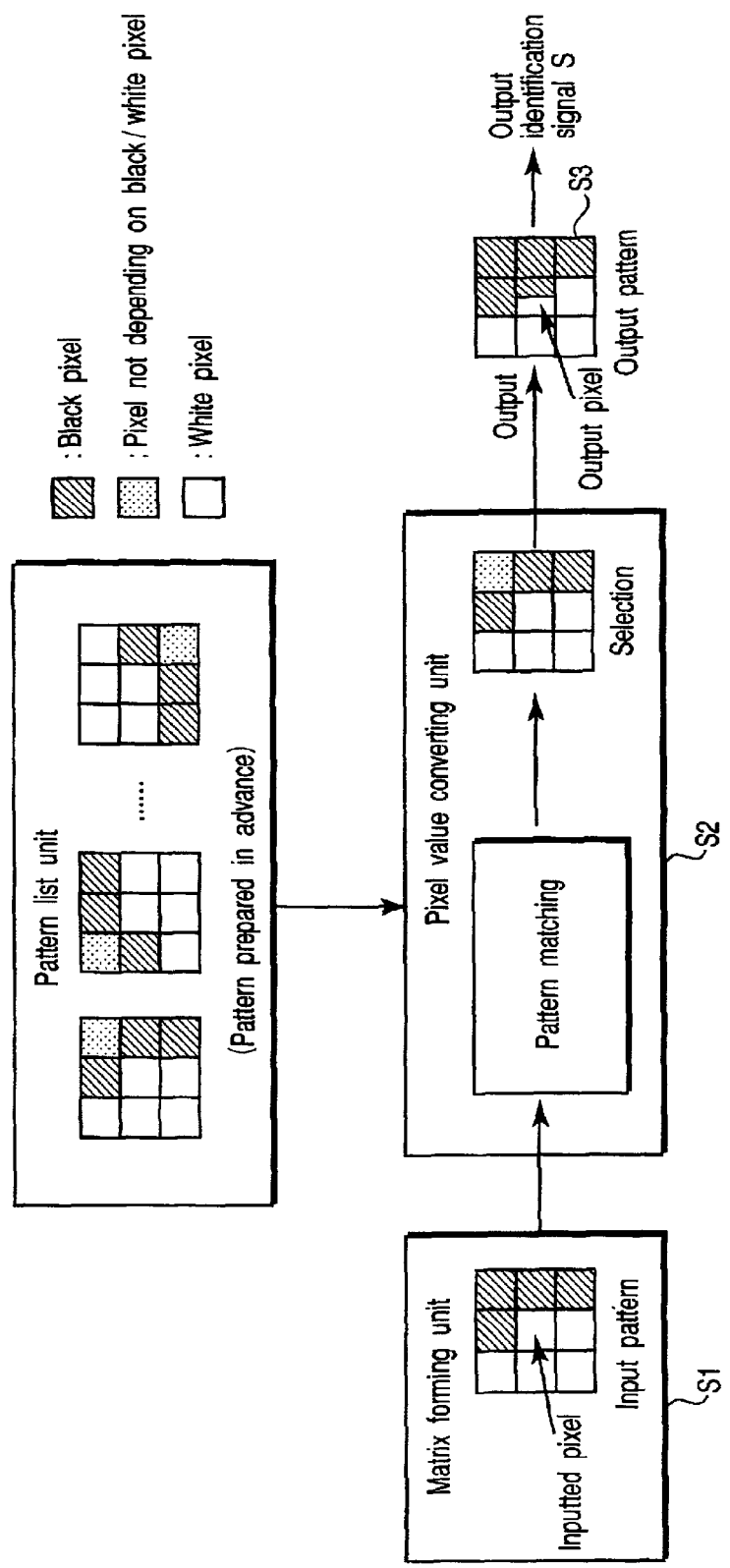
FIG. 3 is a diagram for explaining edge detection and the smoothing processing according to the present invention.
Figure 4:
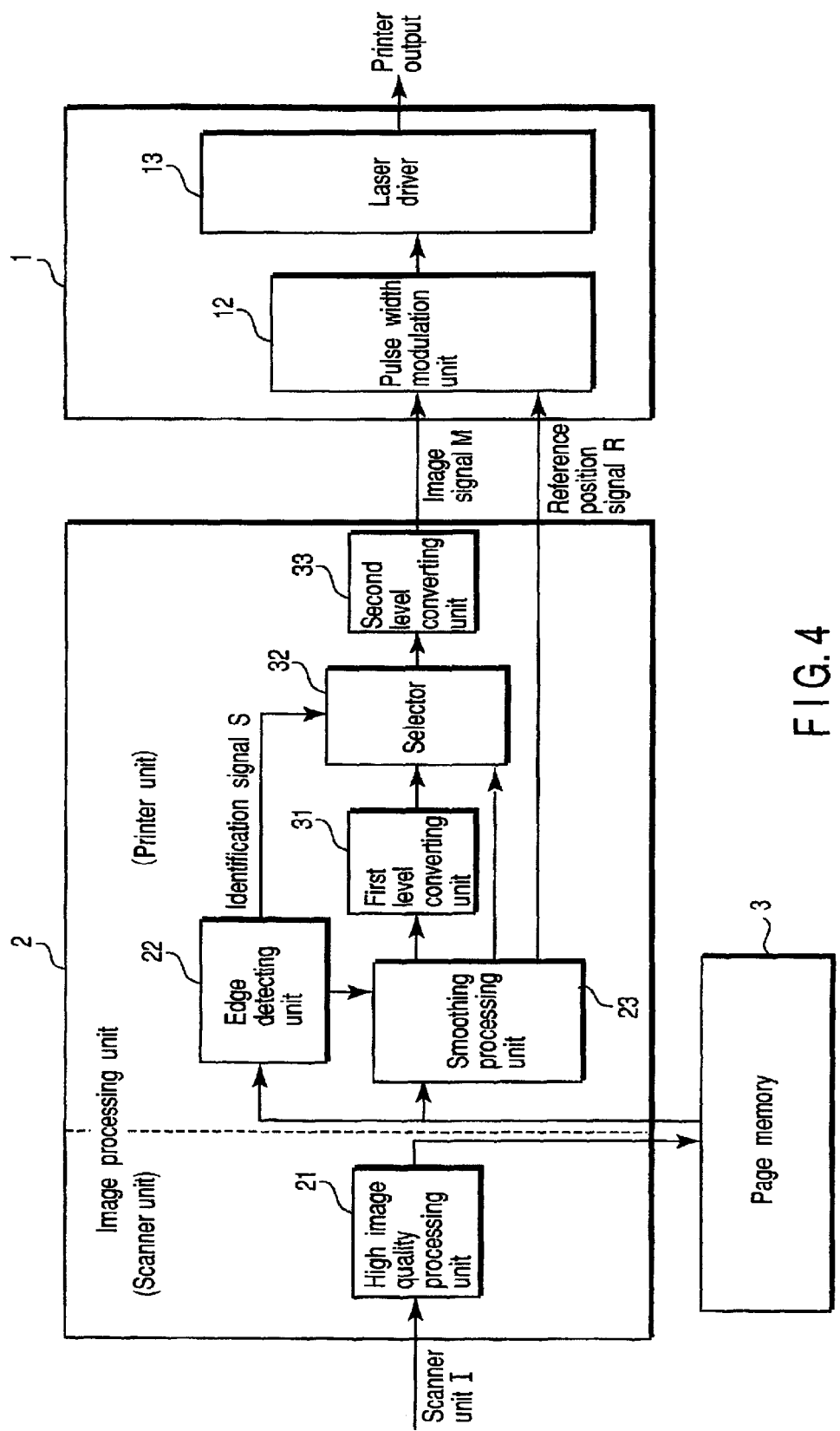
FIG. 4 is a block diagram of an image processing apparatus to use edge emphasis together in addition to the pulse width modulation according to the present invention.

An embodiment according to the present invention will be explained in detail with reference to the drawings below. FIG. 1 is a block diagram of an image processing apparatus to use pulse width modulation and strength modulation together according to the present invention, FIG. 2 is a block diagram of the image processing apparatus including an edge detecting unit and a smoothing processing unit according to the present invention, FIG. 3 is a diagram for explaining edge detection and the smoothing processing according to the present invention, and FIG. 4 is a block diagram of an image processing apparatus of another embodiment according to the present invention.

<Image Processing Apparatus According to the Present Invention>

In a basic constitution unit 1 shown in FIG. 1, the image processing apparatus according to the present invention comprises a level converting unit 11 which is provided with an identification signal accompanied by an edge signal; a pulse width modulation unit 12 which is provided with an image signal M to perform image formation; and a laser driver 13 which is provided with a processing signal from the level converting unit 11 and the pulse width modulation unit 12, which is further provided with a reference position signal R and which supplies a drive signal to a laser driver unit 70 to be described later.

In these image processing apparatuses, the level converting unit 11 is provided with an identification signal S accompanied by an edge signal, the identification signal S is an area identification result with respect to an input image and the number of bits of the identification signal S is defined as not less than 1 bit. In response to this, the level converting unit 11 changes the number of bits of the identification signal S, converts an image signal so as to extend a dynamic range of the image signal and generates a strength modulation signal K in which a value is changeable for each area in association with a value designated by the identification signal S. Then, this strength modulation signal K is supplied to the laser driver 13 so that a picture dot larger than a standard size of a picture dot is printed on an edge portion, for example, in association with an edge signal in a character/line art area by a laser printer to be described later.

Further, in the pulse width modulation unit 12 to be provided with the image signal M, an area ratio of the image signal M is changed by a PWM (pulse width modulation) to be supplied to the laser driver 13 in accordance with the value of the image signal M. Therefore, by using the image signal M of which area ratio is changed and the above described strength modulation signal K together, the laser driver 13 is capable of printing a character with a density higher than the highest picture dot density value designated by the pulse width modulation for each image area designated by the identification signal S. In other words, a laser beam to print a character by a picture dot size not less than the maximum picture dot size in a normal standard is obtained. For example, it is possible to form an image of an edge portion in a character/line art area in a higher contrast. Accordingly, as sufficiently emphasizing a character/line art edge which cannot be obtained by the conventional apparatus, it is also possible to realize a gradation sequence of a halftone signal such as a photographic image or the like.

Further, according to FIG. 2, image processing apparatuses 1 and 2 are illustrated accompanied by an image processing unit 2 which is provided with a scanner signal I as image information from a scanner 103 to be described later. In this image processing unit 2, at first, the scanner signal I as the image information is supplied from the scanner 103 shown in FIGS. 5 and 6 and an image quality of this scanner signal I is improved by a high image quality processing unit 21 to be stored in a page memory 3.

Further, the stored image information is identified mainly as a gradation sequence area and a character/line art area in an edge detecting unit 22. Further, in this case, as shown in FIG. 3, some pixel are sampled centering on target pixel (S1) and then, a pattern of the sampled image information and a pattern prepared in advance in a pattern list unit are matched in a pixel value converting unit (S2). Further, an area where these patterns accord with each other is determined as an edge and an identification signal S in association with this edge is outputted (S3).

Further, with respect to the image signal M of the area determined as an edge, a smoothing processing unit 23 performs the smoothing processing in association with this identification signal S. This smoothing processing determines pixel width so that an outline is smoothed on the basis of information of peripheral pixel and the image signal M whose area ratio is changed is outputted to the pulse width modulation unit 12, so that natural printing without irregularities is enabled. Alternatively, the reference position signal R is outputted to the laser driver 13.

After that, the level conversion is carried out by the level converting unit 11 of the above mentioned basic constitution unit 1 and the pulse width modulation unit 12, further, the pulse width modulation is carried out and the strength modulation signal K to drive a laser unit 70 and the image signal M of which pulse width is changed are supplied to the laser driver 13 (147). In the laser driver 13, the drive signal is outputted as a printer output on the basis of the strength modulation signal K and the image signal M so that the edge portion of the character/line art area is printed with a picture dot larger than a normal picture dot size by a laser printer to be described later.

Therefore, by using the strength modulation and the pulse width modulation together, it is possible to simultaneously realize the smoothing processing and the emphasis of the edge only for the edge of the character/line art as maintaining the gradation sequence information in the halftone area.

<Another Image Processing Apparatus According to the Present Invention>

Further, another image processing apparatus according to the present invention will be described in detail below.

As shown in FIG. 4, in this image processing apparatus, the edge detecting unit 22 and the smoothing processing unit 23 are provided as well as the above described image processing apparatus. However, in this image processing apparatus, a first level converting unit 31 and a second level converting unit 33 are provided and a selector 32 which operates in accordance with the identification signal S is provided.

In this image processing unit 2, the image information identified as the character/line art by the edge detecting unit 22 is supplied after being provided with the smoothing processing in the smoothing processing unit 23. In the first level converting unit 31, a table conversion so as to extend a dynamic range is performed to be supplied to the selector 32.

Alternatively, the image information is directly supplied to the selector 32 without being processed. In the selector 32, in association with the identification signal S to be supplied from the edge detecting unit 22, if the image information is determined as the character/line art, the image information whose level is converted in the first level converting unit is selected to be supplied to the second level converting unit 32. Further, if the image information is determined as the halftone area, the image information, which is not provided with the processing in the first level converting unit 31 but is directly supplied, is selected to be supplied to the second level converting unit 32. In the second level converting unit 33, after the processing to convert a level into a level consistent with a dynamic range width in the pulse width modulation unit 12 is provided, this image signal M is supplied to the pulse width converting unit 12. As described above, in the pulse width converting unit 12, the image signal M whose area ratio is changed by the pulse width modulation is supplied to the laser driver 13.

In this way, according to another image processing apparatus, by using the selector 32 and a plurality of level converting units 31 and 33, it becomes possible to form, for example, an image of the edge portion in the character/line art area with a picture dot size larger than that of a halftone area without using the strength modulation signal K used in the above mentioned image processing apparatus. Accordingly, it becomes possible to perform the smoothing processing and lay sufficient emphasis on the edge of the character/line art area, which are not obtained by the conventional apparatus, as reducing the error identification in the identification processing and maintaining the halftone reproduction.

<Image Forming Apparatus According to the Present Invention>

Figure 5:
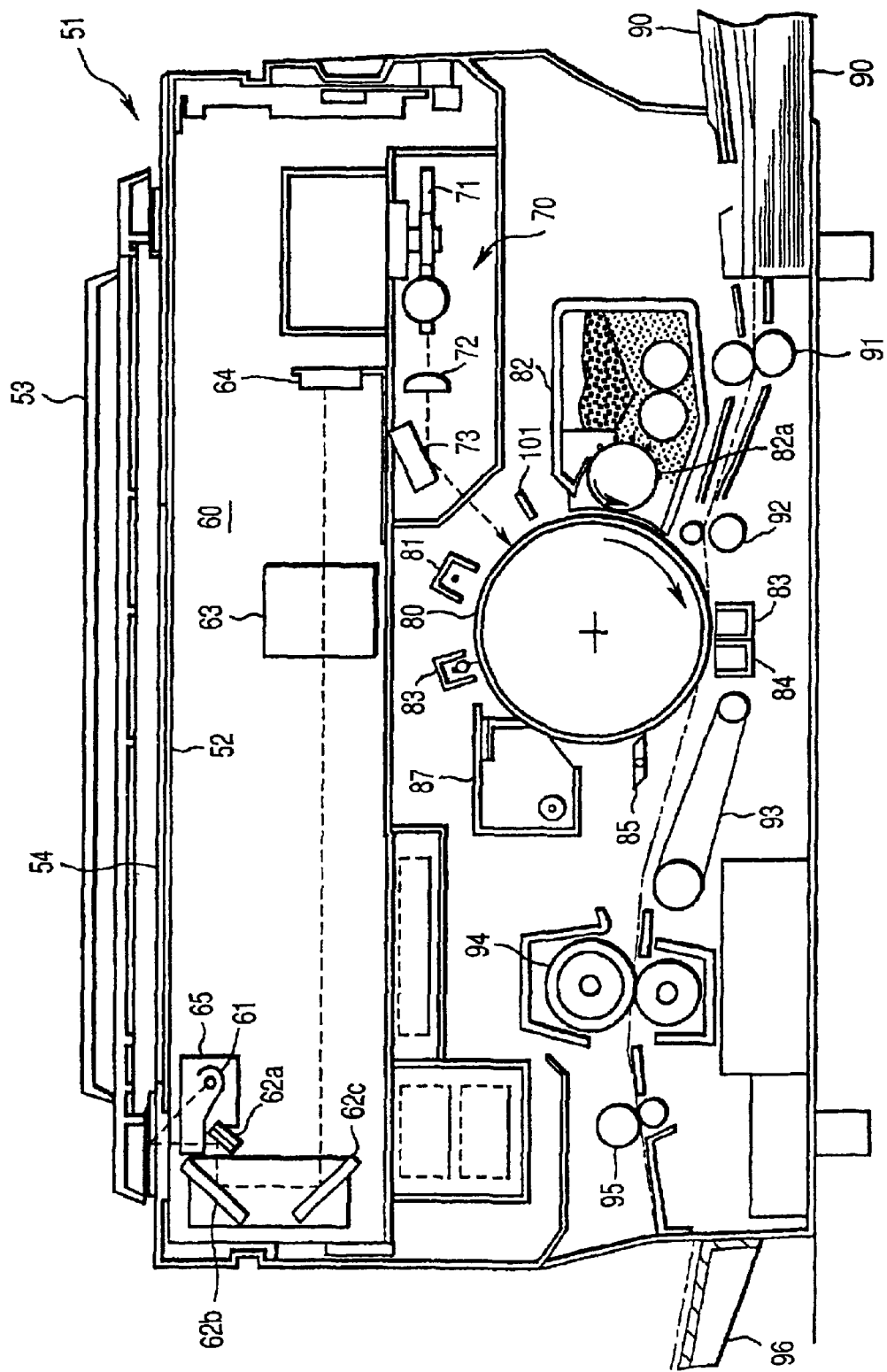
FIG. 5 is a sectional view for illustrating a constitution of an image forming apparatus according to the present invention.
Figure 6:
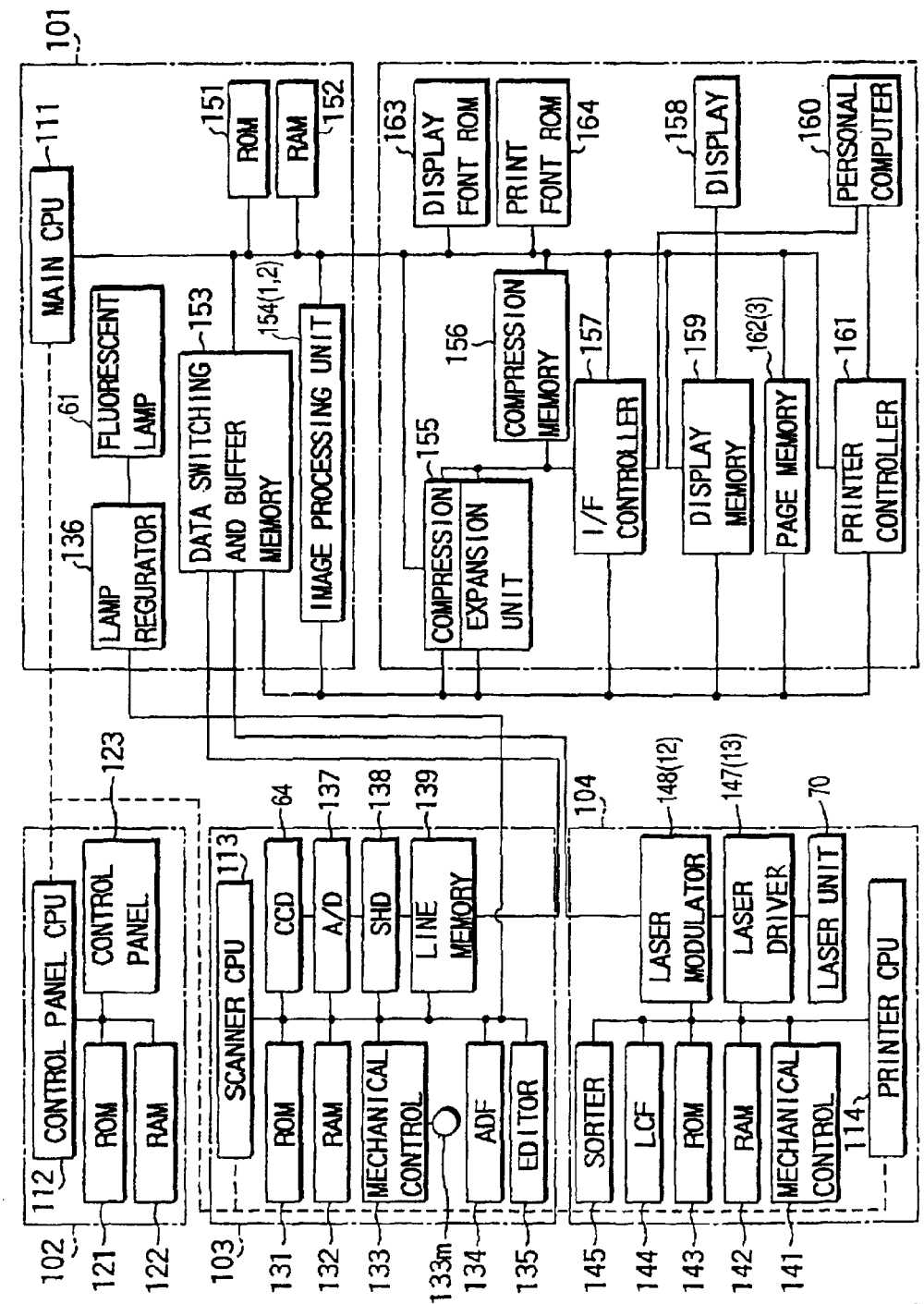
FIG. 6 is a block diagram for illustrating a constitution of an image forming apparatus according to the present invention.
Figure 7:
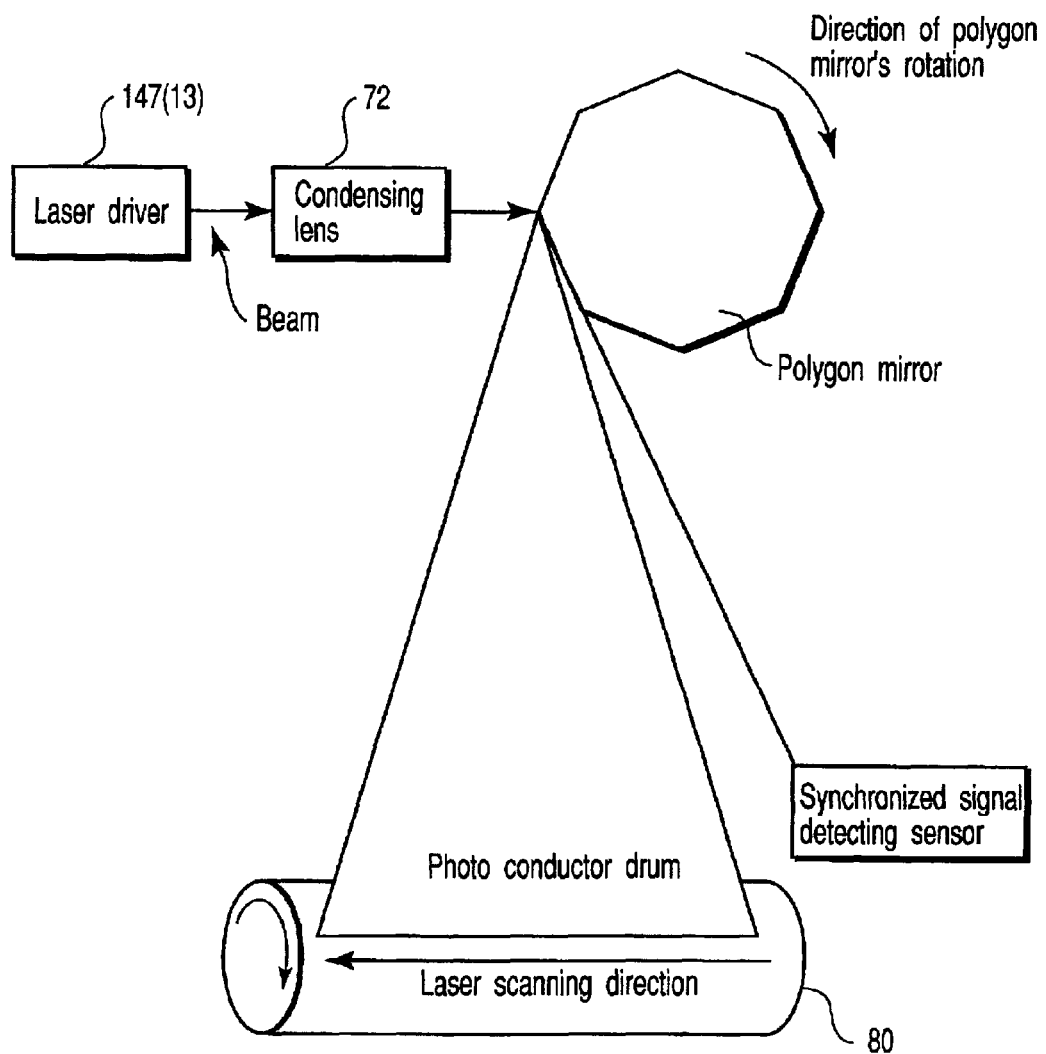
FIG. 7 is an optical system explanatory diagram of a laser mechanism of the image forming apparatus according to the present invention.

Next, an example of an image forming apparatus, in which the above described image processing apparatus according to the present invention is used, will be explained in detain below. FIG. 5 is a sectional diagram for illustrating a constitution of an image forming apparatus according to the processing of the present invention, FIG. 6 is a block diagram for illustrating a constitution of a control system of the image forming apparatus according to the present invention, and FIG. 7 is an optical system explanatory diagram of a laser mechanism of the image forming apparatus according to the present invention.

At first, the image processing apparatus shown in FIG. 5, for example, an electronic copying machine, a script table 52 (a glass plate) for laying a script is disposed on the top of a main body 51 and a script table cover 53 is provided on the top of the script table 52 with being freely opened and closed. On the script table 52, the script 54 is appropriately set.

An exposure system 60 is provided on the top within the main body 51. This exposure system 60 is configured by exposure means provided opposite to a bottom of the script table 52 such as an exposure lamp 61, first to third reflection mirrors 62a, 62b and 62c, a lens block for a variable power 63 and image signal outputting means such as a CCD type of line sensor (hereinafter, referred to as a CCD sensor) 64.

The exposure lamp 61 is disposed on a carriage (CRG) 65 as carrying means with freely reciprocating. The exposure scanning is performed across a whole area of the script table 52 by the reciprocation of the carriage 65 in the right direction in FIG. 5 and the light emission of the exposure lamp 61. Owing to this exposure scanning, the reflection light image of the script 54 to be placed on the script table 52 is obtained and the obtained reflection light image is projected on the CCD sensor 64 by the above described respective reflection mirrors and the lens block for the variable power 63. The CCD sensor 64 outputs an image signal of a level corresponding to an amount of receiving light. This image signal is transmitted to a laser unit 70 after it is transmitted to the image processing unit.

A photo conductor drum 80 is disposed on substantially center portion in the main body 51 as an image support with freely rotating in an arrow direction. Around this photo conductor drum 80, a static charger 81, the laser unit 70, a developing device 82, a transcription charger 83, a peeling-off charger 84, a peeling-off pawl 85, a cleaner 87 and an electricity removal lamp 88 are arranged in sequence.

The laser unit 70 has: a first lens which provides converging to the laser beam emitted from a semiconductor laser element (not illustrated) and which converts this laser beam into a laser beam having substantially circular sectional shape; a laser polarizer 71 which polarizes the laser beam passed through this first lens along an axial of a photo conductor drum 80; an imaging lens 72 which brings a polarization angle into line with a distance from a light axis on the photo conductor drum 80 to a position where the beam should be imaged in order to image the laser beam polarized by this laser polarizer 71 on the photo conductor drum 80 in sequence; and a mirror 73 which guides the laser beam passed through this imaging lens 72 on the photo conductor drum 80, and the like.

The static charger 81 charges static on the surface of the photo conductor drum 80 by applying a high voltage supplied from a charging high voltage transducer (not illustrated) to the photo conductor drum 80 by a corona wire.

Owing to this electrostatic charge and imaging by the laser beam of the laser unit 70 with respect to the photo conductor drum 80, an electrostatic latent image is formed on the photo conductor drum 80.

The developing device 82 contains a binary photographic developer composed of nonmagnetic toner and a magnetic carrier as well as it has a developing roller 82a in order to supply this photographic developer to the photo conductor drum 80.

The developing roller 82a accretes only the toner charged in negative on the electrostatic latent image on the photo conductor drum 80 as holding the photographic developer at the outer periphery. Owing to this accretion, the electrostatic latent image on the photo conductor drum 80 is revealed. In order to reveal the photo conductor drum 80, a developing bias voltage of a predetermined level is applied to the developing roller 82a and the photographic developer from a developing bias generation circuit (not illustrated).

Alternatively, the developing roller 82a is configured by a magnet roller, on which a negative pole and a positive pole are arranged in a circumferential direction, and a nonmagnetic sleeve rotating around this magnet roller in an arrow direction. On this sleeve, an ear (ear rise) of the carrier is formed so as to be along a magnetic line of the magnet roller. The toner is accreted on this ear (ear rise) of the carrier by a mirror image force. Then, this toner moves to the side of the photo conductor drum 80 at a developing position where the photo conductor drum 80 and the developing roller 82a are opposed to each other by an electric field generated by the developing bias voltage and a surface electric potential of the photo conductor drum 80.

A plurality of paper feeding cassettes 90 are provided on the bottom in the main body 51 as paper feeding means. In these paper feeding cassettes 90, many sheets of copy paper having different sizes each other as an imaging forming medium are contained. In response to the ON operation of a copy key on a control panel (operating panel) 123 to be described later as well as in response to a detection result of a script size sensor (not illustrated), a copy paper is taken out one by one by a pick up roller (not illustrated) from any one of the respective paper feeding cassettes 90. The copy paper is taken out to be transmitted to an aligning roller 92 and the copy paper waits for rotation of the photo conductor drum 80 there.

The aligning roller 92 corrects the inclination of the copy paper as well as matches a front end of a toner image on the photo conductor drum 80 with a front end of the copy paper. Further, the photo conductor drum 80 feeds the copy paper at a speed as same as a moving speed on the outer periphery of the photo conductor drum 80. Alternatively, in the vicinity of the aligning roller 92, an aligning switch (not illustrated) as a switch to control the operation timing of the aligning roller 92 is arranged to detect a front end of the copy paper.

The transcription charger 83 transcribes the revealed image (toner) on the photo conductor drum 80 on the copy paper by applying the high voltage to be supplied from a transcription high voltage transducer (not illustrated) to the copy paper, which is fed from the aligning roller 92, as being synchronized with the rotation of the photo conductor drum 80.

The peeling-off charger 84 peels off the copy paper from the photo conductor drum 80 by applying the high voltage to be supplied from a peeling-off high voltage transducer (not illustrated) on the copy paper with the corona wire.

The peeling-off pawl 85 serves to support the peeling-off of the copy paper owing to the peeling-off charger 84.

A cleaner 87 scratches nontranscribed toner remaining on the surface of the photo conductor drum 80 to collect it. The toner to be collected is collected in a toner collecting device (not illustrated), and then is cast away everywhen it reaches to a predetermined amount.

The electricity removal lamp 83 emits light by the voltage supplied from a light source driver (not illustrated) and removes the remaining electric potential remaining on the photo conductor drum 80.

The copy paper to be peeled off by the peeling-off charger 84 is transferred to a fixing device (heat roller) 94 by the feeding belt 93. The fixing device 94 fixes a revealed image transcribed on the copy paper on the copy paper by heating and sealing it.

The copy paper, on which the revealed image has been fixed, is discharged to a discharging tray 96 by a discharging roller 95. In the vicinity of the discharging roller 95, a discharging switch (not illustrated) is arranged. If this discharging switch detects a rear end of the copy paper, the image forming operation for the copy paper has been completed.

Alternatively, FIG. 7 illustrates a system such that the laser driver 13 and a condensing lens 72 form an image on the photo conductor drum 80 by using a polygon mirror.

<Control System>

Next, a control system to control this electric copying machine will be explained below with reference to FIG. 6. Simultaneously, how to use the above described image processing apparatus according to the present invention will be explained below.

In FIG. 6, a main CPU (central processing unit) 111 is connected to a control panel CPU 112, a scanner CPU 113 and a printer CPU 114 through communication lines. Alternatively, the main CPU 111 entirely controls these control panel CPU 112, scanner CPU 113 and printer CPU 114 so as to entirely control copying.

Further, a ROM (read only memory) 121, a RAM (random access memory) 122 and a control panel (operating panel) 123 are connected to the control panel CPU 112. The control panel CPU 112 detects the operation of switches on the control panel 123 (a switch to set a multiplying power and a size of the paper is also included), turns on a light of a LED, turns off a light thereof and controls the displaying device, and the like.

A ROM 131, a RAM 132, a control unit 133 of a mechanical control or the like such as a motor solenoid, an ADF (auto document feeder) 134, an editor (a coordinate inputting device) 135, an A/D circuit (analog/digital converting circuit) 137 to convert an analog image signal outputted from the CCD sensor 64 into, for example, an image signal of 8 bits, a shading correcting circuit (SHD) 138 and a line memory 139 are connected to the scanner CPU 113. A pulse motor to move the carriage 65 in the sub scanning direction is connected to the control unit 133. Further, the exposure lamp 61 is connected to the scanner CPU 113 via a lamp regulator 136.

A control unit 141 of a mechanical control or the like such as a motor solenoid switch, a RAM 142, a ROM 143, an LCF (large cassette feeder) 144, a sorter 145, a laser driver 147 to drive the laser unit 70 and a laser modulation circuit 148 are connected to the printer CPU 114.

Further, a data switching and buffer memory 153 which switches a destination of the data read by a ROM 151, a RAM 152 and the scanner portion 103, switches data to be transferred to a printer engine and which performs buffering; an image processing circuit 154 which performs visual processing with respect to the image signal; a compression/expansion unit 155 which compresses or expands the image signal; a compression memory 156 which stocks the data compressed by the compression/expansion unit 155; an I/F controller 157 which interfaces with a hard disk drive, an optical disk drive and a facsimile adapter; a display memory 159 which stores an image signal to be displayed on a display 58; a printer controller 161 which expands code data of a personal computer 160 into the image signal; a page memory 162 which stocks the image signal for each page; a display font ROM 163 which expands the code data to a display 158; and a print font ROM 164 which expands the code data on the page memory circuit 162 are connected to the main CPU 111.

Such a constitution is roughly divided into a basic processing unit 101, a control panel 102, the scanner unit 103 and a printer engine 104.

According to a control system having such a constitution, the above described image processing apparatus according to the present invention is provided with the image processing unit 2 shown in FIG. 2, the level converting unit 11 of the basic constitution unit 1 and the pulse width modulation unit 12 as a portion of the image processing unit 154. Further, the pulse width modulation unit 12 of the basic constitution unit 1 corresponds to the laser modulator 148 of the printer unit 104 and the laser driver 13 corresponds to the laser driver 147 of the printer unit 104. Furthermore, the page memory 3 shown in FIG. 2 and FIG. 4 corresponds to the page memory 162 in the above described control system.

According to such a control system, the switching and buffer memory 153 provided with the image of the script scanned by the scanner unit 103 provides the above described processing of the image processing unit 2 included in the switching and buffer memory 153 shown in FIG. 2 or FIG. 4. Further, the switching and buffer memory 153 is provided with the level converting processing of the level converting unit 11 of the basic constitution unit 1 and the modulation processing of the pulse width modulation unit 12. Therefore, as described above, the level converting unit 11 and the pulse width modulation unit 12 convert the level and further, they performs the pulse width modulation, so that the strength modulation signal K for driving the laser unit 70 and the image signal M of which pulse width is modulated are supplied to the laser driver 147.

As described above, in the laser driver 147, on the basis of the strength modulation signal K and the image signal M which are supplied, the driving signal is generates so that the edge portion of the character/line art area is printed with a picture dot larger than a picture dot size of the halftone area by the laser unit 70. Then, the generated driving signal is supplied to the laser unit 70. Therefore, it is possible to control the power of the laser beam in association with the edge of the character/line art area. Further, it is possible to realize the smoothing processing and the emphasis of the edge having a high contrast only to the edge of the character/line art as maintaining the gradation sequence information in the halftone area.

What is claimed is:

1. An image processing apparatus comprising:
   an edge detecting unit which identifies an area of given image data as a gradation sequence area and a character/line art area and which outputs edge information of the character/line art on the basis of this identification result;
   a level converting unit which generates a strength modulation signal in order to convert a level of said image data into a value different for each area on the basis of the edge information from said edge detecting unit; and
   a laser driver which outputs a laser drive signal in order to form a picture dot larger than a standard size in a predetermined area detected by said edge detecting unit in response to a strength modulation signal to be supplied from said level converting unit with respect to said given image data.

2. An image processing apparatus according to claim 1, further comprising:
   a pulse width modulating unit which receives said image data and which modulates this pulse width to output the image data to said laser driver.

3. An image processing apparatus according to claim 1, wherein said level converting unit generates said strength modulation signal such that the strength of the image formation of said character/line art area identified by said edge detecting unit is larger than the strength of other area.

4. An image processing apparatus according to claim 1, wherein said level converting unit generates said strength modulation signal such that the strength of the image formation of said character/line art area identified by said edge detecting unit is larger than the strength of said halftone area.

5. An image processing apparatus comprising:
   an edge detecting unit which identifies an area of given image data as a gradation sequence area and a character/line art area and which outputs edge information of the character/line art on the basis of this identification result;
   a smoothing processing unit which performs smoothing processing with respect to an image of a predetermined area identified by said edge detecting unit to output;
   a level converting unit which generates a strength modulation signal in order to convert a level of said image data into a value different for each area on the basis of the edge information from said edge detecting unit; and a laser driver which outputs a laser drive signal in order to form a picture dot larger than a standard size in a predetermined area detected by said edge detecting unit in response to a strength modulation signal to be supplied from said level converting unit with respect to the image data provided with the smoothing processing by said smoothing processing unit.

6. An image processing apparatus according to claim 5, further comprising:

a pulse width modulating unit which modulates a pulse width of the image data provided with the smoothing processing by said smoothing processing unit and which outputs the image data to said laser driver.

7. An image processing apparatus according to claim 5, further comprising:

a smoothing processing unit which performs the smoothing processing with respect to the image data of a predetermined area identified by said edge detecting unit to output.

8. An image processing apparatus according to claim 5, wherein said level converting unit increases the number of bits of an identification signal indicating the identification result of said edge detecting unit and which adds a strength modulation signal to convert a level of said image data into another value for said every area as a portion of the identification signal.

9. An image processing apparatus according to claim 5, wherein said smoothing processing unit has determining means to determine a pixel width so as to smooth its outline on the basis of peripheral pixel information of target pixel with respect to the image of the predetermined area identified by said edge detecting unit.

10. An image processing apparatus comprising:

an edge detecting unit which identifies an area of given image data as a gradation sequence area and a character/line art area and which outputs edge information of the character/line art on the basis of this identification result;

a first level converting unit which converts a level of said image data detected as a character/line art area by said edge detecting unit so as to extend a dynamic range of said image data and which outputs said image data;

a second level converting unit which is provided with said image data whose level is converted by said first level converting unit so as to extend a dynamic range of said image data and said image data detected as a character/line art area by said edge detecting unit, and which converts levels of these image data; and a laser driver which is provided said image data whose level is converted by said second level and which outputs a laser drive signal on the basis of these image data.

11. An image processing apparatus according to claim 10, further comprising:

a smoothing processing unit which performs smoothing processing with respect to the image data of the character/line art area identified by said edge detecting unit and which supplies said image data to said first level converting unit.

12. An image processing apparatus according to claim 10, further comprising:

a pulse width modulating unit which modulates a pulse width of said image data whose level is converted by said second level converting unit and which outputs said image data to said laser driver.

13. An image processing apparatus according to claim 11, wherein said smoothing processing unit has determining means to determine a pixel width so as to smooth its outline on the basis of peripheral pixel information of target pixel with respect to said image of the predetermined area identified by said edge detecting unit.

14. An image processing apparatus comprising:

a level converting unit which is provided with given image data and edge information thereof and which generates a strength modulation signal in order to convert a level of said image data into a value different for each area on the basis of the given image data and the edge information thereof; and a laser driver which outputs a laser drive signal in order to form a picture dot larger than a standard size in a predetermined area detected by said edge detecting unit corresponding to said edge information in response to the strength modulation signal to be supplied from said level converting unit with respect to said given image data.

15. An image forming apparatus comprising:

an edge detecting unit which identifies an area of given image data as a gradation sequence area and a character/line art area and which outputs edge information of the character/line art on the basis of this identification result;

a level converting unit which generates a strength modulation signal in order to convert a level of said image data into a value different for each area on the basis of the edge information from said edge detecting unit;

a laser driver which outputs a laser drive signal in order to form a picture dot larger than a standard size in a predetermined area detected by said edge detecting unit in response to the strength modulation signal to be supplied from said level converting unit with respect to said given image data; and a laser unit which forms an image on a recording medium on the basis of said image data in response to a laser drive signal to be supplied from said laser driver.

16. An image forming apparatus comprising:

an edge detecting unit which identifies an area of given image data as a gradation sequence area and a character/line art area and which outputs edge information of the character/line art on the basis of this identification result;

a smoothing processing unit which performs smoothing processing with respect to an image of a predetermined area identified by said edge detecting unit to output;

a level converting unit which generates a strength modulation signal in order to convert a level of said image data into a value different for each area on the basis of the edge information from said edge detecting unit;

a laser driver which outputs a laser drive signal in order to form a picture dot larger than a standard size in a predetermined area detected by said edge detecting unit in response to the strength modulation signal to be supplied from said level converting unit with respect to the image data provided with the smoothing processing by said smoothing processing unit; and a laser unit which forms an image on a recording medium on the basis of said image data in response to a laser drive signal to be supplied from said laser driver.

17. An image forming apparatus comprising:

an edge detecting unit which identifies an area of given image data as a gradation sequence area and a character/line art area and which outputs edge information of the character/line art on the basis of this identification result;

a first level converting unit which converts a level of said image data detected as a character/line art area by said edge detecting unit so as to extend a dynamic range of said image data and outputs said image data;

a second level converting unit which is provided with the image data whose level is converted so as to extend a dynamic range of said image data and said image data detected as a character/line art area by said edge detecting unit and which converts levels of these image data;

a laser driver which is provided with said image data whose level is converted by said second level converting unit and which outputs a laser drive signal on the basis of these image data; and a laser unit which forms an image on the basis of said image data on a recording medium in response to a laser signal to be supplied by said laser driver.

* * * * *